UNITED STATES PATENT OFFICE.

JOSEF HOFMANN, OF BERLIN, GERMANY.

PROCESS OF REGENERATING ACCUMULATOR-ELECTRODES.

SPECIFICATION forming part of Letters Patent No. 678,255, dated July 9, 1901.

Application filed March 28, 1901. Serial No. 53,339. (No specimens.)

*To all whom it may concern:*

Be it known that I, JOSEF HOFMANN, a subject of the Emperor of Austria-Hungary, and a resident of Berlin, Germany, have invented a Process of Regenerating Accumulator-Electrodes, of which the following is a specification.

It has heretofore been proposed to produce and regenerate accumulator-battery electrodes chemically by the use of hypochlorites—such as magnesium hypochlorite, sodium hypochlorite, and chlorid of lime—the action in regenerating or recharging the electrodes being to convert into peroxid of lead the sulfate of lead formed during the generation of current by the battery when in use. Such a mode of regenerating electrodes, however, carries with it the disadvantage that during the oxidation of the electrode a deposit of the salt or salts of the base of the hypochlorite is formed thereon, which deposit prevents further action. This deposit, which always appears again at each recharging, has naturally a bad effect upon the electrodes, since it increases considerably the internal resistance of the battery, as experience has shown. Thus in an accumulator with electrodes of peroxid of lead and zinc, in which the regeneration of the electrode was effected with sodium hypochlorite, the electromotive force, which originally amounted to 2.3 volts, dropped down to 1.6 volts. If calcium hypochlorite be used for the regeneration, this diminution of electromotive force will take place still more rapidly, as the deposited gypsum will make the electrode useless with repeated recharging. To avoid these disadvantages and yet effect the regeneration of accumulator-electrodes by chemical means in a practically feasible way, I employ, instead of hypochlorites, free hypochlorous acid in solution, and I subject the electrodes to the action of this hypochlorous acid outside of the accumulator-battery.

My improved process is especially adapted for use in the regeneration of negative electrodes which are to be employed in the accumulator in conjunction with positive dissolving electrodes.

In carrying out my invention the regeneration of a lead-peroxid electrode is effected by the action of hypochlorous acid which has been set free in solution by the addition of acid to a hypochlorite, and for this purpose calcium hypochlorite is well suited. For example, if this calcium hypochlorite be used, as may conveniently be done in the techical form of chlorid of lime, all that is necessary is to mix the calcium hypochlorite with a dilute acid, such as dilute nitric acid or dilute phosphoric acid, and to filter the solution. The filtrate contains besides the resultant soluble calcium salt (calcium nitrate, for example) mainly hypochlorous acid, (HCO.) Calcium phosphate, I may mention, would remain on the filter on account of its insolubility.

While I do not wish to restrict myself to specific proportions, I may mention, by way of example merely, that to form a solution such as above I may employ, say, one kilogram of commercial calcium hypochlorite to from one hundred to one hundred and fifty grams of dilute nitric acid at, say, 48° Baumé. Into this solution the lead electrode to be regenerated is placed or suspended, and the subchlorous acid is allowed to act for a sufficient length of time (half an hour, for example) to convert the sulfate of lead of this negative electrode into peroxid again, so that the electrode will be ready for use once more. Then it is only necessary to rinse the thus-treated electrode well in water and put it back again into the battery, and the regeneration will have been effected in such a manner that there will have been practically no diminution of its electromotive force, and the regeneration may be repeated as often as desired without loss of electromotive force so long as the surface of the positive lead electrode lasts. The oxidizing action of the aqueous solution of hypochlorous acid far exceeds the action of the hypochlorites, and the formation of an objectionable deposit during the regeneration of the electrode is avoided, because hydrogen has taken the place of the calcium, sodium, or potassium, the effective agent in my process being the hypochlorous acid instead of the salts heretofore proposed.

I claim as my invention—

1. The herein-described process of regenerating the lead-peroxid electrode of an accumulator-battery, said process consisting in subjecting such electrode to the action of a solution of free hypochlorous acid, substantially as set forth.

2. The herein-described process of regenerating the lead-peroxid electrode of an accumulator-battery, said process consisting in removing the electrode from the battery and subjecting the electrode outside the battery to the action of a solution of free hypochlorous acid, substantially as set forth.

3. The herein-described process of regenerating the lead-peroxid electrode of an accumulator-battery, said process consisting in removing the electrode from the battery and subjecting the electrode outside the battery to the action of a solution of free hypochlorous acid, and then rinsing the electrode in water, substantially as set forth.

4. The herein-described process of regenerating the lead-peroxid electrode of an accumulator-battery, said process consisting in adding acid to a solution of calcium hypochlorite, outside the battery and subjecting the electrode to the action of the hypochlorous acid set free in that solution, substantially as set forth.

In testimony whereof I have signed my name to this specification in the presence of two subscribing witnesses.

JOSEF HOFMANN.

Witnesses:
HUBERT HOWSON,
F. WARREN WRIGHT.